US012380863B2

(12) United States Patent
Im et al.

(10) Patent No.: US 12,380,863 B2
(45) Date of Patent: Aug. 5, 2025

(54) DATA DRIVER, DISPLAY DEVICE INCLUDING THE SAME, AND METHOD FOR DRIVING DISPLAY DEVICE

(71) Applicant: Samsung Display Co., LTD., Yongin-si (KR)

(72) Inventors: Taegon Im, Yongin-si (KR); Youngmin Bae, Yongin-si (KR); Jinyoung Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/609,648

(22) Filed: Mar. 19, 2024

(65) Prior Publication Data

US 2025/0046258 A1 Feb. 6, 2025

(30) Foreign Application Priority Data

Aug. 1, 2023 (KR) ........................ 10-2023-0100287

(51) Int. Cl.
*G09G 3/3291* (2016.01)
*G09G 3/3275* (2016.01)
*G09G 3/36* (2006.01)

(52) U.S. Cl.
CPC ....... *G09G 3/3291* (2013.01); *G09G 2310/08* (2013.01); *G09G 2330/021* (2013.01)

(58) Field of Classification Search
None
See application file for complete search history.

(56) References Cited

U.S. PATENT DOCUMENTS 7,956,833 B2 * 6/2011 Ito ........................ G09G 3/3655 345/87
8,487,859 B2 * 7/2013 Kim ..................... G09G 3/3688 345/100
2008/0001941 A1 * 1/2008 Miura .................. G09G 3/3688 345/212
2008/0068316 A1 * 3/2008 Maekawa ............ G09G 3/3655 345/87

(Continued)

FOREIGN PATENT DOCUMENTS

KR 101666578 B1 10/2016

*Primary Examiner* — Sephehr Azari
(74) *Attorney, Agent, or Firm* — CANTOR COLBURN LLP

(57) ABSTRACT

A display device includes a display panel including a plurality of pixels and a plurality of data lines connected to the pixels, and a data driver which provide a plurality of data voltages to the data lines. The data driver includes a plurality of channels, where each of the channels outputs an $n^{th}$ data voltage in an $n^{th}$ horizontal period, and outputs an $(n+1)^{th}$ data voltage in an $(n+1)^{th}$ horizontal period, where n is a natural number, a common line, a plurality of data switches, which selectively connect the channels to the data lines, respectively, a plurality of common switches, each of which selectively connects a corresponding one of the channels to the common line, and a voltage sensor which senses a common voltage of the common line.

16 Claims, 13 Drawing Sheets

(56) References Cited

U.S. PATENT DOCUMENTS

| | | | | |
|---|---|---|---|---|
| 2011/0221983 | A1* | 9/2011 | Lee | G09G 3/3655 349/33 |
| 2015/0145844 | A1* | 5/2015 | Kwak | G09G 3/3688 345/96 |
| 2015/0287374 | A1* | 10/2015 | Chen | G09G 3/3648 345/98 |
| 2016/0180781 | A1* | 6/2016 | Kim | G09G 3/3655 345/212 |
| 2017/0285825 | A1* | 10/2017 | Mizuhashi | G06F 3/0446 |
| 2021/0142757 | A1* | 5/2021 | Hu | G09G 3/3696 |
| 2022/0189411 | A1* | 6/2022 | Kim | G09G 3/3275 |
| 2024/0395223 | A1* | 11/2024 | Chen | G09G 3/20 |

* cited by examiner

DATA DRIVER, DISPLAY DEVICE INCLUDING THE SAME, AND METHOD FOR DRIVING DISPLAY DEVICE

This application claims priority to Korean Patent Application No. 10-2023-0100287, filed on Aug. 1, 2023, and all the benefits accruing therefrom under 35 U.S.C. § 119, the content of which in its entirety is herein incorporated by reference.

BACKGROUND

1. Field

Embodiments relate to a display device. More particularly, embodiments relate to a display device, a data driver included in the display device, and a method for driving the display device.

2. Description of the Related Art

A display device may include a data driver configured to provide data voltages to data lines. The data driver may include channels configured to output the data voltages. The channel may output the data voltage to the data line for each horizontal period.

When a voltage level of the data voltage output from the channel is changed, power consumption for outputting the data voltage may be increased. Accordingly, when the channel alternately outputs a data voltage having a high voltage level and a data voltage having a low voltage level to the data line for each horizontal period, power consumption of the data driver may be increased.

SUMMARY

Embodiments provide a display device in which power consumption is reduced.

Embodiments provide a data driver in which power consumption is reduced.

Embodiments provide a method for driving a display device for reducing power consumption.

A display device according to embodiments includes a display panel including a plurality of pixels and a plurality of data lines connected to the pixels, and a data driver which provides a plurality of data voltages to the data lines. In such embodiments, the data driver includes a plurality of channels, where each of the channels outputs an $n^{th}$ data voltage (where n is a natural number) in an $n^{th}$ horizontal period, and outputs an $(n+1)^{th}$ data voltage in an $(n+1)^{th}$ horizontal period, a common line, a plurality of data switches which selectively connects the channels to the data lines, respectively, a plurality of common switches, where each of the common switches selectively connects a corresponding one of the channels to the common line, and a voltage sensor which senses a common voltage of the common line.

In an embodiment, the data driver may further include a voltage comparator which compares the common voltage, the $n^{th}$ data voltage, and the $(n+1)^{th}$ data voltage with each other.

In an embodiment, a channel among the channels may be connected to the common line by a common switch corresponding thereto among the common switches when the common voltage is between the $n^{th}$ data voltage of the channel and the $(n+1)^{th}$ data voltage of the channel.

In an embodiment, the data driver may further include a capacitor connected between the common line and a ground.

In an embodiment, the data driver may further include a plurality of capacitors connected to a ground, and a plurality of capacitor switches, where each of the capacitor switches selectively connects a corresponding one of the capacitors to the common line.

In an embodiment, capacitances of the capacitors may be equal to each other.

In an embodiment, capacitances of the capacitors may be different from each other.

In an embodiment, the common voltage may be increased or decreased by selective operations of the capacitor switches.

In an embodiment, when the common voltage is less than a minimum reference voltage, the common voltage may be increased.

In an embodiment, when the common voltage is greater than a maximum reference voltage, the common voltage may be decreased.

In an embodiment, each of the data lines may extend in a first direction, and the common line may extend in a second direction intersecting the first direction.

In an embodiment, the display device may further include a scan driver which provides a plurality of scan signals to the pixels, and a controller which controls the data driver and the scan driver.

A data driver which provide a plurality of data voltages to a plurality of data lines according to embodiments includes a plurality of channels, where each of the channels outputs an $n^{th}$ data voltage (where n is a natural number) in an $n^{th}$ horizontal period, and outputs an $(n+1)^{th}$ data voltage in an $(n+1)^{th}$ horizontal period, a common line, a plurality of data switches which selectively connects the channels to the data lines, respectively, a plurality of common switches, where each of the common switches selectively connects a corresponding one of the channels to the common line, and a voltage sensor which senses a common voltage of the common line.

In an embodiment, the data driver may further include a voltage comparator which compares the common voltage, the $n^{th}$ data voltage, and the $(n+1)^{th}$ data voltage with each other.

In an embodiment, a channel among the channels may be connected to the common line by a common switch corresponding thereto among the common switches when the common voltage is between the $n^{th}$ data voltage of the channel and the $(n+1)^{th}$ data voltage of the channel.

In an embodiment, the data driver may further include a plurality of capacitors connected to a ground, and a plurality of capacitor switches, where each of the capacitor switches selectively connects a corresponding one of the capacitors to the common line.

A method for driving a display device according to embodiments includes outputting an $n^{th}$ data voltage from a channel to a data line, latching an $(n+1)^{th}$ data voltage to the channel, where n is a natural number, sensing a common voltage of a common line, comparing the common voltage, the $n^{th}$ data voltage, and the $(n+1)^{th}$ data voltage with each other, connecting the channel to the common line when the common voltage is between the $n^{th}$ data voltage and the $(n+1)^{th}$ data voltage, and outputting the $(n+1)^{th}$ data voltage from the channel to the data line.

In an embodiment, the method may further include increasing or decreasing the common voltage after the connecting the channel to the common line and before the outputting the $(n+1)^{th}$ data voltage.

In an embodiment, the increasing or decreasing the common voltage may include increasing the common voltage when the common voltage is less than a minimum reference voltage.

In an embodiment, the increasing or decreasing the common voltage may include decreasing the common voltage when the common voltage is greater than a maximum reference voltage.

In the display device and the data driver included in the display device according to embodiments of the disclosure, the voltage sensor may sense the common voltage of the common line, and the channels may share charges through the common line, so that the data voltages of the channels may be pre-charged, and the power consumption of the data driver may be reduced.

In the method for driving the display device according to embodiments of the disclosure, the common voltage of the common line may be sensed, and the channels may share charges through the common line by comparing the common voltage, the $n^{th}$ data voltage, and the $(n+1)^{th}$ data voltage, so that the data voltages of the channels may be pre-charged, and the power consumption of the data driver may be reduced.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
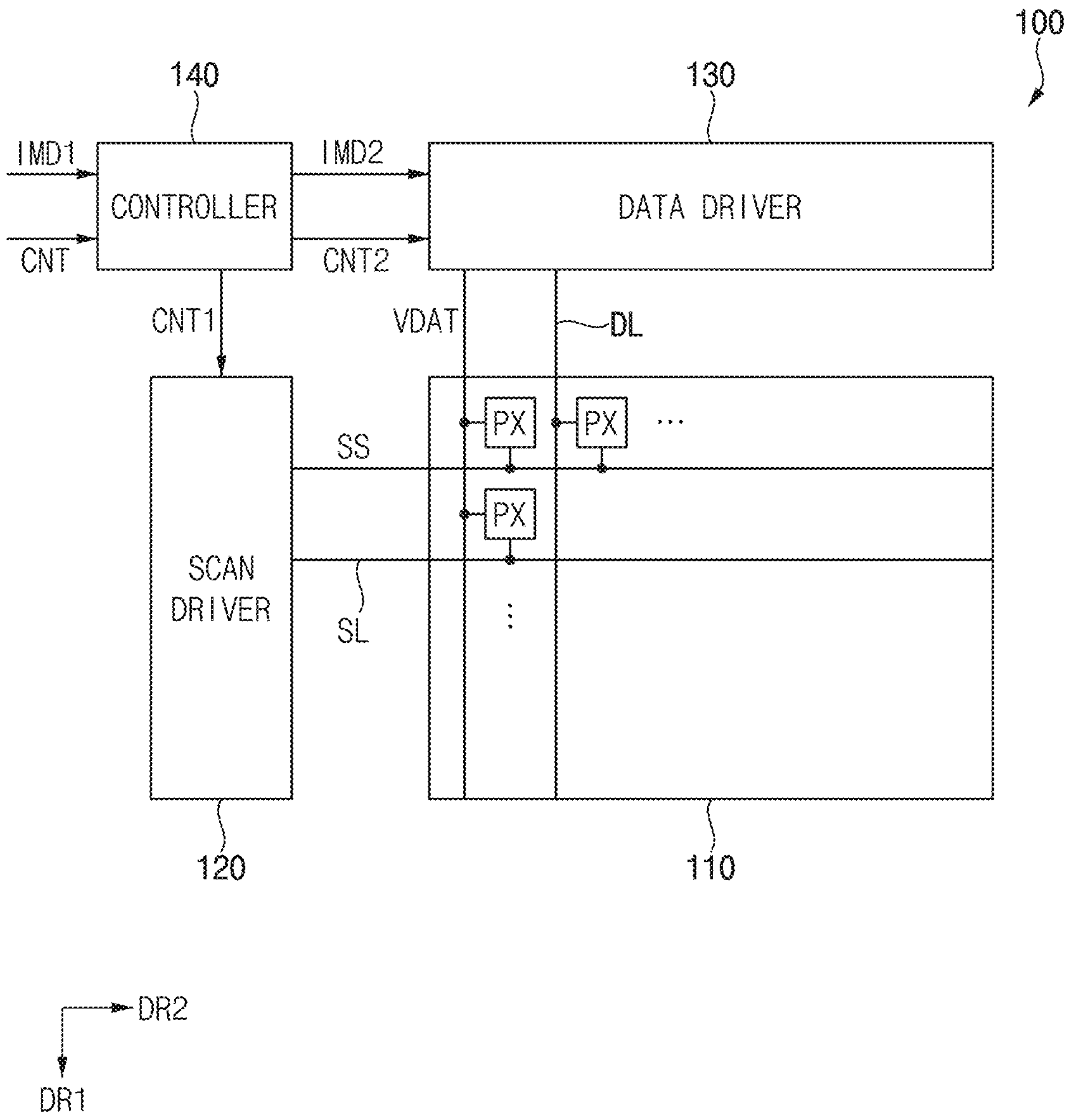
FIG. 1 is a block diagram showing a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device, a data driver, and a method for driving a display device according to embodiments of the disclosure will be described in greater detail with reference to the accompanying drawings.

FIG. 1 is a block diagram showing a display device 100 according to an embodiment of the disclosure.

Referring to FIG. 1, an embodiment of a display device 100 may include a display panel 110, a scan driver 120, a data driver 130, and a controller 140.

The display panel 110 may include pixels PX, data lines DL, and scan lines SL. According to an embodiment, the pixels PX may include a first pixel which emit a light having a first color, a second pixel which emit a light having a second color, and a third pixel which emit a light having a third color. In an embodiment, for example, the first color, the second color, and the third color may be red, green, and blue, respectively.

According to an embodiment, the pixel PX may include an organic light emitting diode. According to another embodiment, the pixel PX may include an inorganic light emitting diode, a micro light emitting diode, a quantum dot light emitting diode, or the like.

The scan lines SL may be connected to the pixels PX. The scan lines SL may be arranged in a first direction DR1. Each of the scan lines SL may extend in a second direction DR2. The second direction DR2 may intersect the first direction DR1. According to an embodiment, the second direction DR2 may be perpendicular to the first direction DR1.

The data lines DL may be connected to the pixels PX. The data lines DL may be arranged in the second direction DR2. Each of the data lines DL may extend in the first direction DR1. The data lines DL may intersect the scan lines SL.

The scan driver 120 may provide scan signals SS to the scan lines SL. The scan driver 120 may sequentially generate scan signals SS corresponding to pixel rows, respectively, based on a first control signal CNT1. The first control signal CNT1 may include a scan clock signal, a scan start signal, or the like.

The data driver 130 may provide data voltages VDAT to the data lines DL. The data driver 130 may generate data voltages VDAT corresponding to pixel columns, respectively, based on second image data IMD2 and a second control signal CNT2. According to an embodiment, the second image data IMD2 may include gray level values corresponding to the pixels PX, respectively. The second control signal CNT2 may include a data clock signal, a horizontal start signal, a load signal, or the like.

The controller 140 may control an operation (or driving) of the scan driver 120 and an operation (or driving) of the data driver 130. The controller 140 may generate the first control signal CNT1, the second control signal CNT2, and the second image data IMD2 based on first image data IMD1 and a control signal CNT. According to an embodiment, the first image data IMD1 may include gray level (or grayscale) values corresponding to the pixels PX, respectively. The controller 140 may convert the first image data IMD1 into the second image data IMD2. The control signal CNT may include a master clock signal, a vertical synchronization signal, a horizontal synchronization signal, a data enable signal, or the like.

Figure 2:
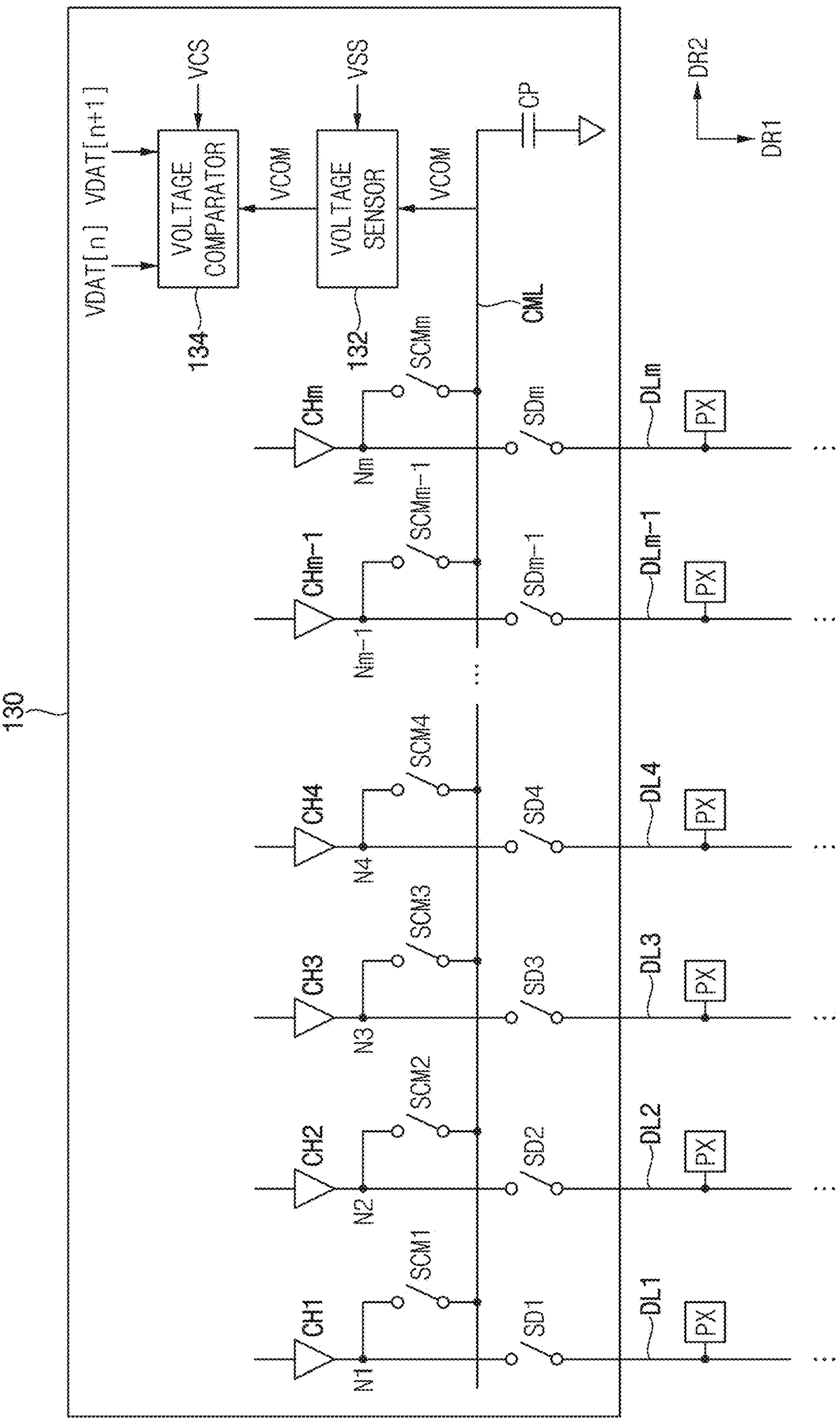
FIG. 2 is a block diagram showing a data driver according to an embodiment of the disclosure.

FIG. 2 is a block diagram showing a data driver 130 according to an embodiment of the disclosure.

Referring to FIG. 2, in an embodiment, the data driver 130 may include first to $m^{th}$ channels CH1, CH2, CH3, CH4, . . . , CHm−1, and CHm (where m is a natural number that is greater than or equal to 6), a common line CML, a capacitor CP, first to $m^{th}$ data switches SD1, SD2, SD3, SD4, . . . , SDm−1, and SDm, first to $m^{th}$ common switches SCM1, SCM2, SCM3, SCM4, . . . , SCMm−1, and SCMm, a voltage sensor 132, and a voltage comparator 134.

Each of the first to $m^{th}$ channels CH1, CH2, CH3, CH4, . . . , CHm−1, and CHm may output a data voltage VDAT in a horizontal period. In an embodiment, for example, each of the first to $m^{th}$ channels CH1, CH2, CH3, CH4, . . . , CHm−1, and CHm may output an $n^{th}$ data voltage VDAT[n] (where n is a natural number) in an $n^{th}$ horizontal period, and output an $(n+1)^{th}$ data voltage VDAT[n+1] in an $(n+1)^{th}$ horizontal period. The first to $m^{th}$ channels CH1, CH2, CH3, CH4, . . . , CHm−1, and CHm may be arranged in the second direction DR2.

The common line CML may be disposed between first to $m^{th}$ data lines DL1, DL2, DL3, DL4, . . . , DLm−1, and DLm and the first to $m^{th}$ channels CH1, CH2, CH3, CH4, . . . , CHm−1, and CHm. The common line CML may extend in the second direction DR2.

The capacitor CP may be connected between the common line CML and a ground. The capacitor CP may be directly connected to the common line CML. The capacitor CP may store a common voltage VCOM of the common line CML.

The first to $m^{th}$ data switches SD1, SD2, SD3, SD4, . . . , SDm−1, and SDm may selectively connect the first to $m^{th}$ channels CH1, CH2, CH3, CH4, . . . , CHm−1, and CHm to the first to $m^{th}$ data lines DL1, DL2, DL3, DL4, . . . , DLm−1, and DLm, respectively. The first data switch SD1 may selectively connect the first channel CH1 to the first data line DL1, the second data switch SD2 may selectively connect the second channel CH2 to the second data line DL2, the third data switch SD3 may selectively connect the third channel CH3 to the third data line DL3, the fourth data switch SD4 may selectively connect the fourth channel CH4 to the fourth data line DL4, the $(m-1)^{th}$ data switch SDm−1 may selectively connect the $(m-1)^{th}$ channel CHm−1 to the $(m-1)^{th}$ data line DLm−1, and the $m^{th}$ data switch SDm may selectively connect the $m^{th}$ channel CHm to the $m^{th}$ data line DLm. The first data switch SD1 may be connected between a first node N1 of the first channel CH1 and the first data line DL1, the second data switch SD2 may be connected between a second node N2 of the second channel CH2 and the second data line DL2, the third data switch SD3 may be connected between a third node N3 of the third channel CH3 and the third data line DL3, the fourth data switch SD4 may be connected between a fourth node N4 of the fourth channel CH4 and the fourth data line DL4, the $(m-1)^{th}$ data switch SDm−1 may be connected between an $(m-1)^{th}$ node Nm−1 of the $(m-1)^{th}$ channel CHm−1 and the $(m-1)^{th}$ data line DLm−1, and the $m^{th}$ data switch SDm may be connected between an $m^{th}$ node Nm of the $m^{th}$ channel CHm and the $m^{th}$ data line DLm.

The first to $m^{th}$ common switches SCM1, SCM2, SCM3, SCM4, . . . , SCMm−1, and SCMm may selectively connect the first to $m^{th}$ channels CH1, CH2, CH3, CH4, . . . , CHm−1, and CHm to the common line CML. The first common switch SCM1 may selectively connect the first channel CH1 to the common line CML, the second common switch SCM2 may selectively connect the second channel CH2 to the common line CML, the third common switch SCM3 may selectively connect the third channel CH3 to the common line CML, the fourth common switch SCM4 may selectively connect the fourth channel CH4 to the common line CML, the $(m-1)^{th}$ common switch SCMm−1 may selectively connect the $(m-1)^{th}$ channel CHm−1 to the common line CML, and the $m^{th}$ common switch SCMm may selectively connect the $m^{th}$ channel CHm to the common line CML. The first common switch SCM1 may be connected between the first node N1 and the common line CML, the second common switch SCM2 may be connected between the second node N2 and the common line CML, the third common switch SCM3 may be connected between the third node N3 and the common line CML, the fourth common switch SCM4 may be connected between the fourth node N4 and the common line CML, the $(m-1)^{th}$ common switch SCMm−1 may be connected between the $(m-1)^{th}$ node Nm−1 and the common line CML, and the $m^{th}$ common switch SCMm may be connected between the $m^{th}$ node Nm and the common line CML.

The voltage sensor 132 may sense the common voltage VCOM of the common line CML in response to a voltage sensing signal VSS. The voltage sensor 132 may provide the common voltage VCOM to the voltage comparator 134.

The voltage comparator 134 may compare the common voltage VCOM, the $n^{th}$ data voltage VDAT[n], and the $(n+1)^{th}$ data voltage VDAT[n+1] with each other in response to a voltage comparison signal VCS. The voltage comparator 134 may compare the $n^{th}$ data voltage VDAT[n] and the $(n+1)^{th}$ data voltage VDAT[n+1] of each of the first to $m^{th}$ channels CH1, CH2, CH3, CH4, . . . , CHm−1, and CHm with the common voltage VCOM.

Hereinafter, an operation of the data driver 130 of FIG. 2 will be described with reference to FIGS. 3 to 9.

Figure 3:
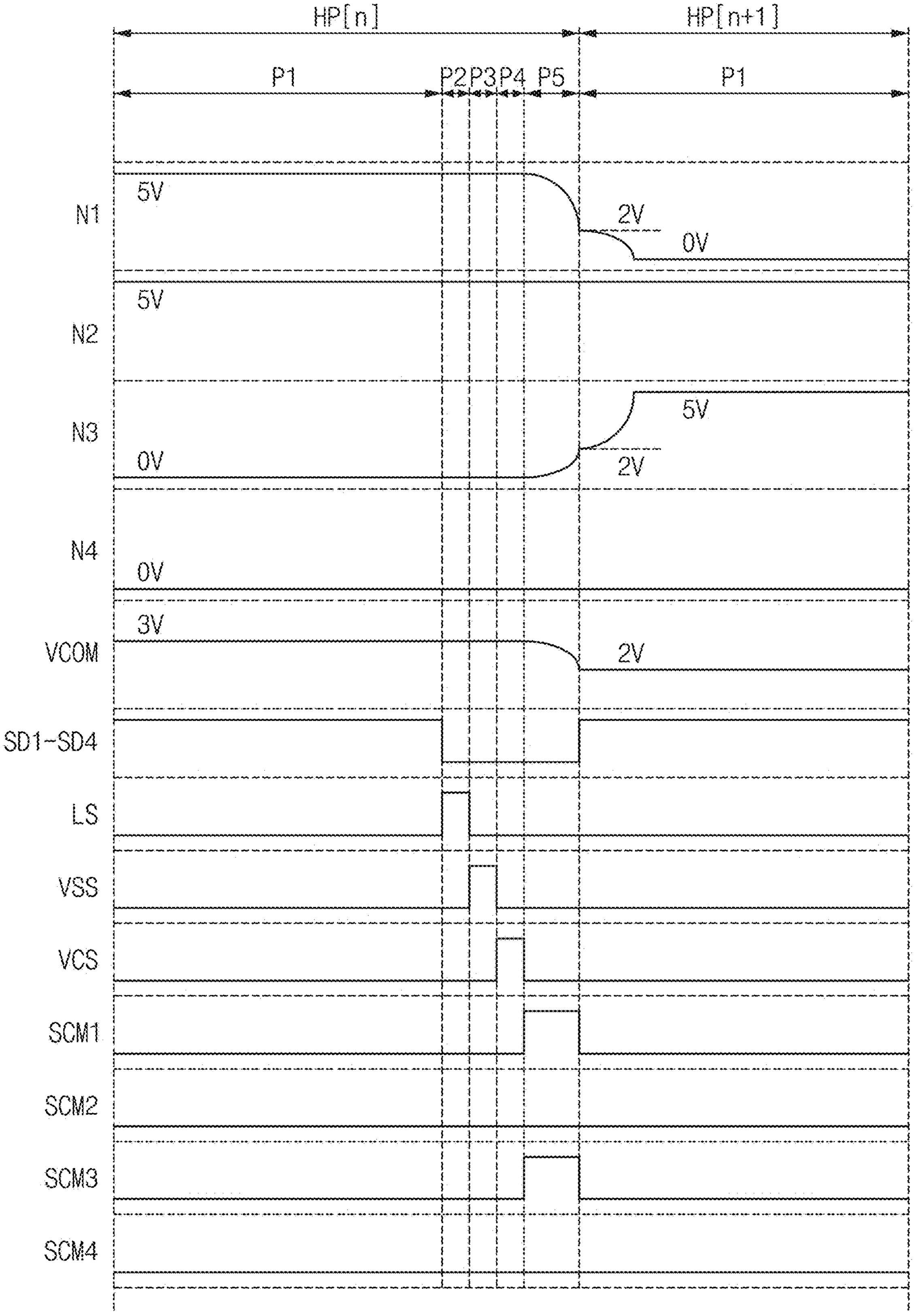
FIG. 3 is a timing diagram for describing an $n^{th}$ horizontal period and an $(n+1)^{th}$ horizontal period of the data driver of FIG. 2.

FIG. 3 is a timing diagram for describing an $n^{th}$ horizontal period HP[n] and an $(n+1)^{th}$ horizontal period HP[n+1] of the data driver 130 of FIG. 2. FIGS. 4 to 9 are views for describing an operation of the data driver 130 of FIG. 2.

Descriptions of the operation of the data driver 130 of FIG. 2, which will be provided with reference to FIGS. 3 to 9, will focus on the first to fourth channels CH1, CH2, CH3, and CH4; and the first to fourth data switches SD1, SD2, SD3, and SD4 and the first to fourth common switches SCM1, SCM2, SCM3, and SCM4, which are connected to the first to fourth channels CH1, CH2, CH3, and CH4, for convenience of illustration and description. In addition, in the operation of the data driver 130 of FIG. 2, which will be described with reference to FIGS. 3 to 9, it would be understood that the first channel CH1 outputs an $n^{th}$ data voltage VDAT[n] of about 5 volts (V) in the $n^{th}$ horizontal period HP[n] and outputs an $(n+1)^{th}$ data voltage VDAT[n+1] of about 0 V in the $(n+1)^{th}$ horizontal period HP[n+1], the second channel CH2 outputs an $n^{th}$ data voltage VDAT[n] of about 5 V in the $n^{th}$ horizontal period HP[n] and outputs an $(n+1)^{th}$ data voltage VDAT[n+1] of about 5 V in the $(n+1)^{th}$ horizontal period HP[n+1], the third channel CH3 outputs an $n^{th}$ data voltage VDAT[n] of about 0 V in the $n^{th}$ horizontal period HP[n] and outputs an $(n+1)^{th}$ data voltage VDAT[n+1] of about 5 V in the $(n+1)^{th}$ horizontal period HP[n+1], and the fourth channel CH4 outputs an $n^{th}$ data voltage VDAT[n] of about 0 V in the $n^{th}$ horizontal period HP[n] and outputs an $(n+1)^{th}$ data voltage VDAT[n+1] of about 0 V in the $(n+1)^{th}$ horizontal period HP[n+1].

Referring to FIGS. 2 and 3, the horizontal period HP may include a first period P1, a second period P2, a third period P3, a fourth period P4, and a fifth period P5.

The first to fourth data switches SD1, SD2, SD3, and SD4 may be turned on in the first period P1, and turned off in the second to fifth periods P2, P3, P4, and P5. A latch signal LS may have a turn-on voltage level in the second period P2, and have a turn-off voltage level in the first and third to fifth periods P1, P3, P4, and P5. The voltage sensing signal VSS may have a turn-on voltage level in the third period P3, and have a turn-off voltage level in the first, second, fourth, and fifth periods P1, P2, P4, and P5. The voltage comparison signal VCS may have a turn-on voltage level in the fourth period P4, and have a turn-off voltage level in the first to third and fifth periods P1, P2, P3, and P5. The first to fourth common switches SCM1, SCM2, SCM3, and SCM4 may be selectively turned on in the fifth period P5, and turned off in the first to fourth periods P1, P2, P3, and P4.

Figure 4:
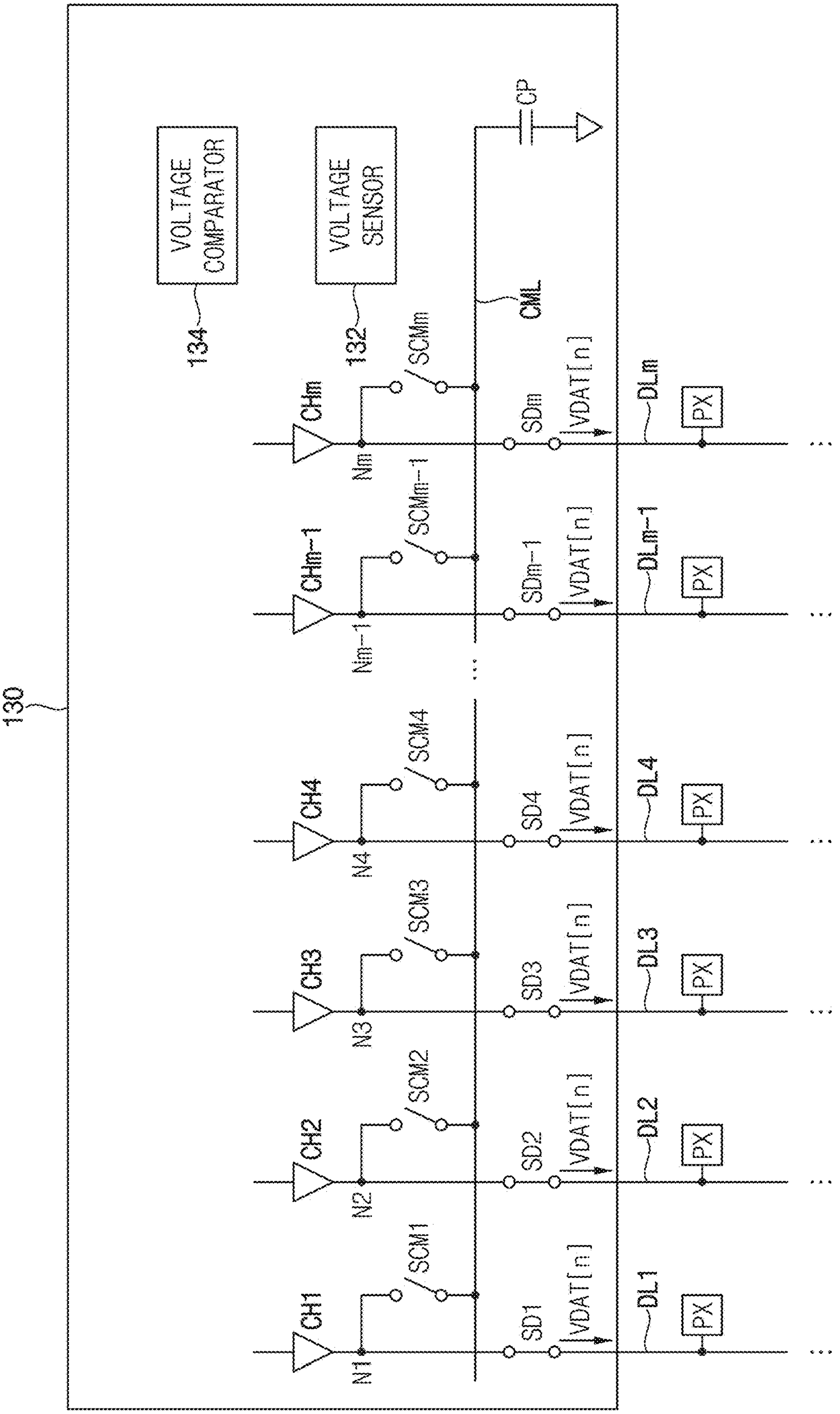
FIGS. 4 to 9 are views for describing an operation of the data driver of FIG. 2.

Referring to FIGS. 3 and 4, in the first period P1 of the $n^{th}$ horizontal period HP[n], the first to fourth channels CH1, CH2, CH3, and CH4 may output $n^{th}$ data voltages VDAT[n]. The first to fourth data switches SD1, SD2, SD3, and SD4 may be turned on, and the first to fourth channels CH1, CH2, CH3, and CH4 may be connected to the first to fourth data lines DL1, DL2, DL3, and DL4, respectively. Accordingly, the $n^{th}$ data voltages VDAT[n] output from the first to fourth channels CH1, CH2, CH3, and CH4 may be transmitted to the first to fourth data lines DL1, DL2, DL3, and DL4, respectively.

Figure 5:
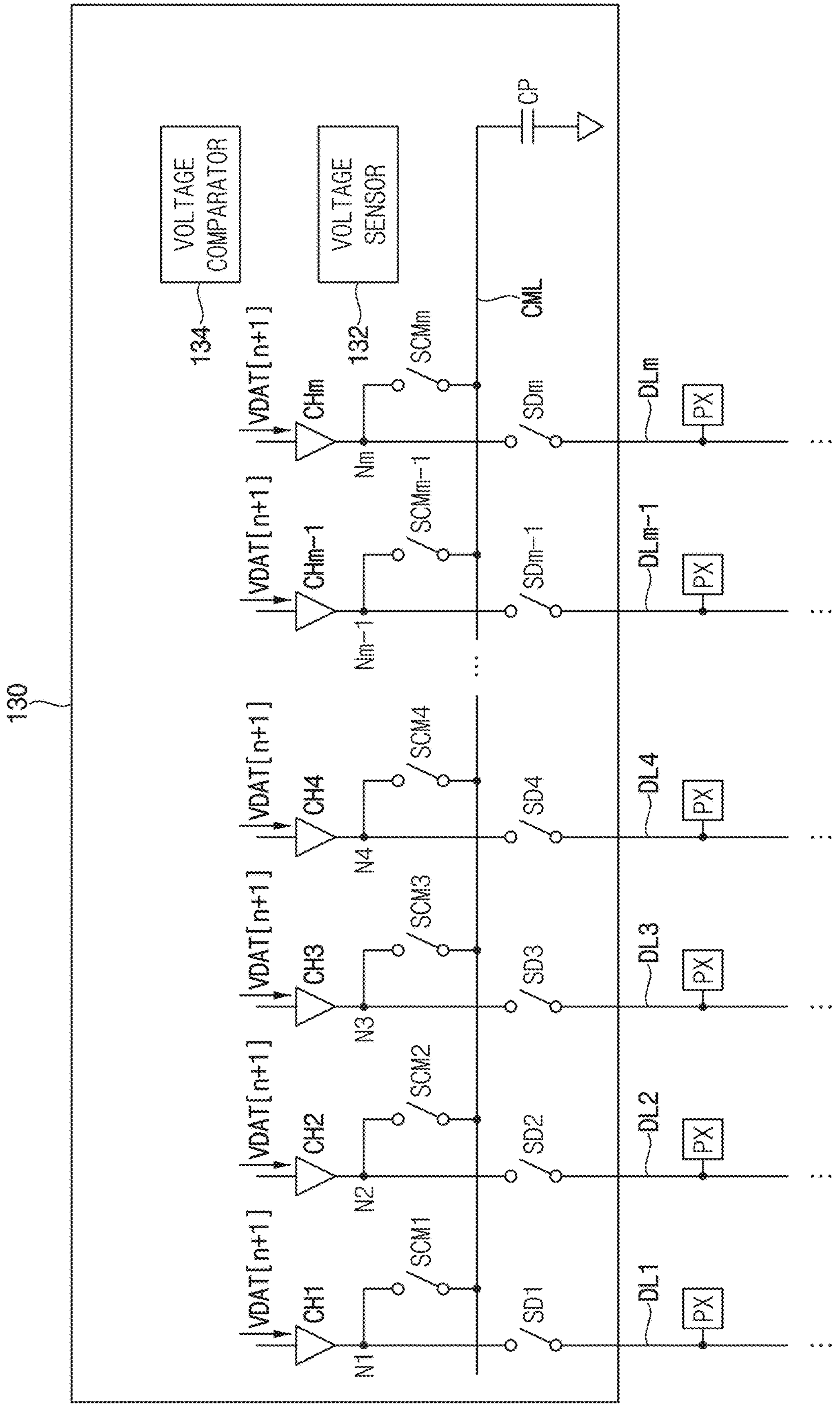

Referring to FIGS. 3 and 5, in the second period P2 of the $n^{th}$ horizontal period HP[n], the first to fourth data switches SD1, SD2, SD3, and SD4 may be turned off, and the latch signal LS may have the turn-on voltage level. In response to the latch signal LS having the turn-on voltage level, $(n+1)^{th}$ data voltages VDAT[n+1] may be latched to the first to fourth channels CH1, CH2, CH3, and CH4.

Figure 6:
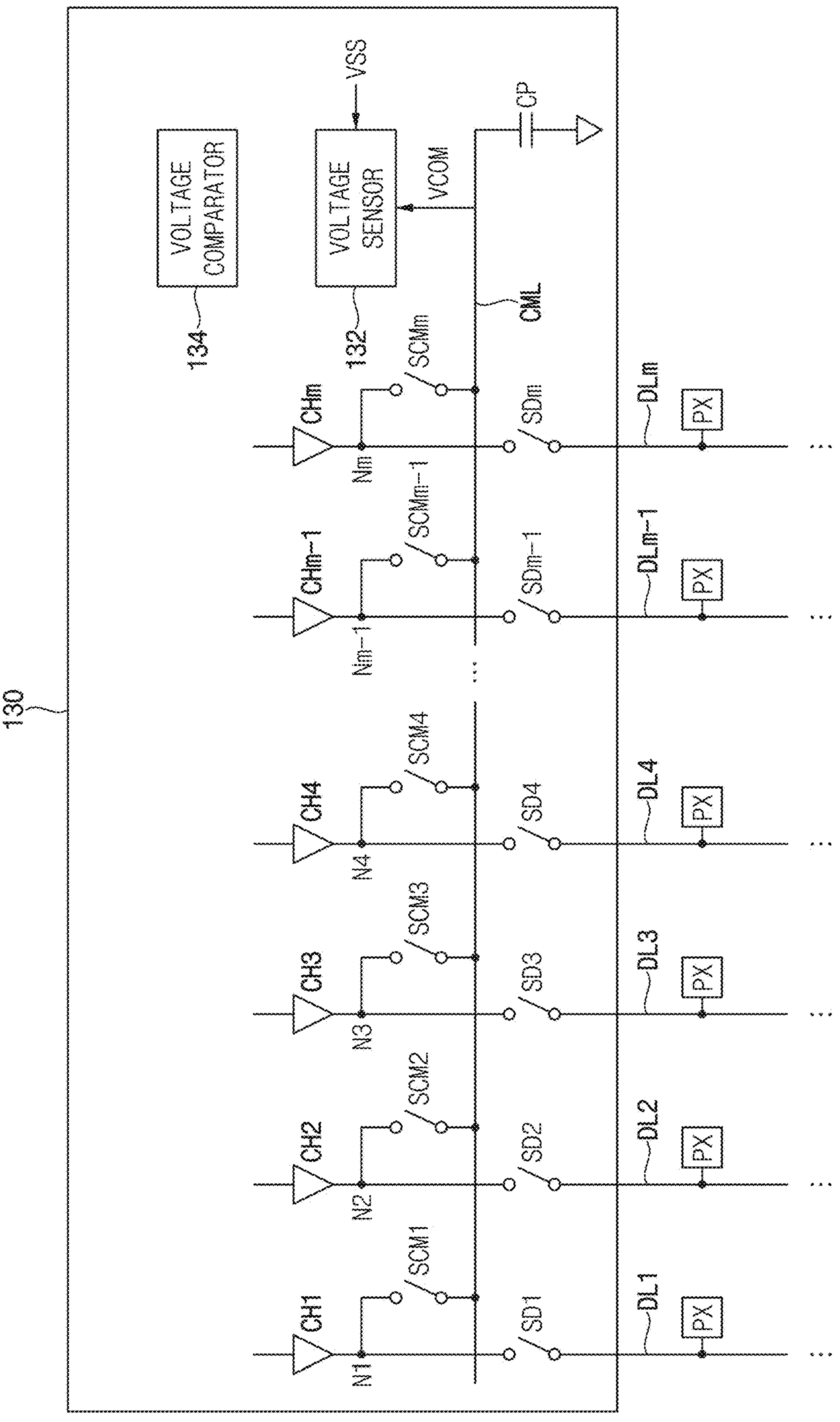

Referring to FIGS. 3 and 6, in the third period P3 of the $n^{th}$ horizontal period HP[n], the voltage sensing signal VSS may have the turn-on voltage level. In response to the voltage sensing signal VSS having the turn-on voltage level, the voltage sensor 132 may sense the common voltage VCOM of the common line CML.

Figure 7:
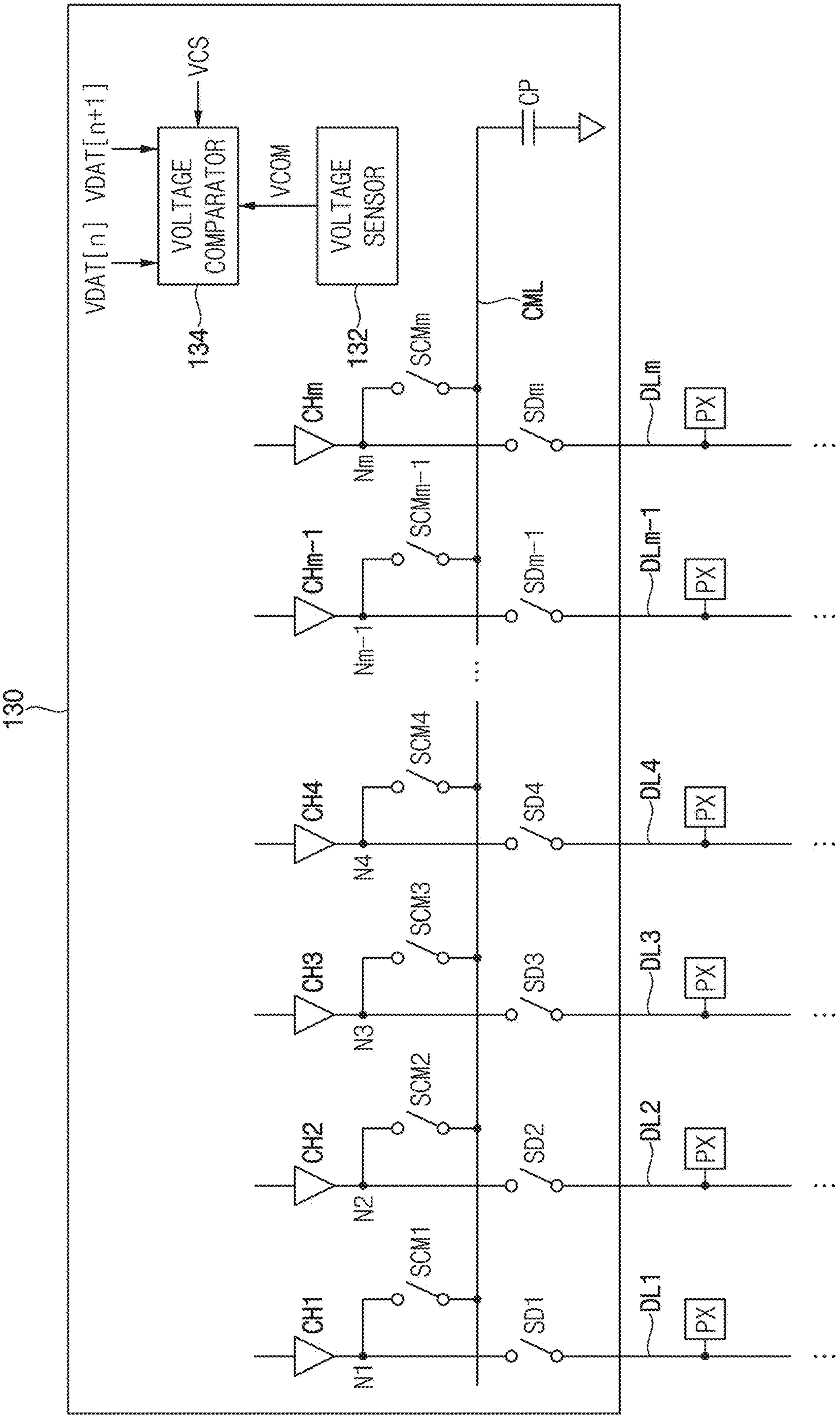

Referring to FIGS. 3 and 7, in the fourth period P4 of the $n^{th}$ horizontal period HP[n], the voltage comparison signal VCS may have the turn-on voltage level. In response to the voltage comparison signal VCS having the turn-on voltage level, the voltage comparator 134 may compare the common voltage VCOM, the $n^{th}$ data voltage VDAT[n], and the $(n+1)^{th}$ data voltage VDAT[n+1] with each other. The voltage comparator 134 may compare the $n^{th}$ data voltage VDAT[n] and the $(n+1)^{th}$ data voltage VDAT[n+1] of each of the first to fourth channels CH1, CH2, CH3, and CH4 with the common voltage VCOM.

Figure 8:
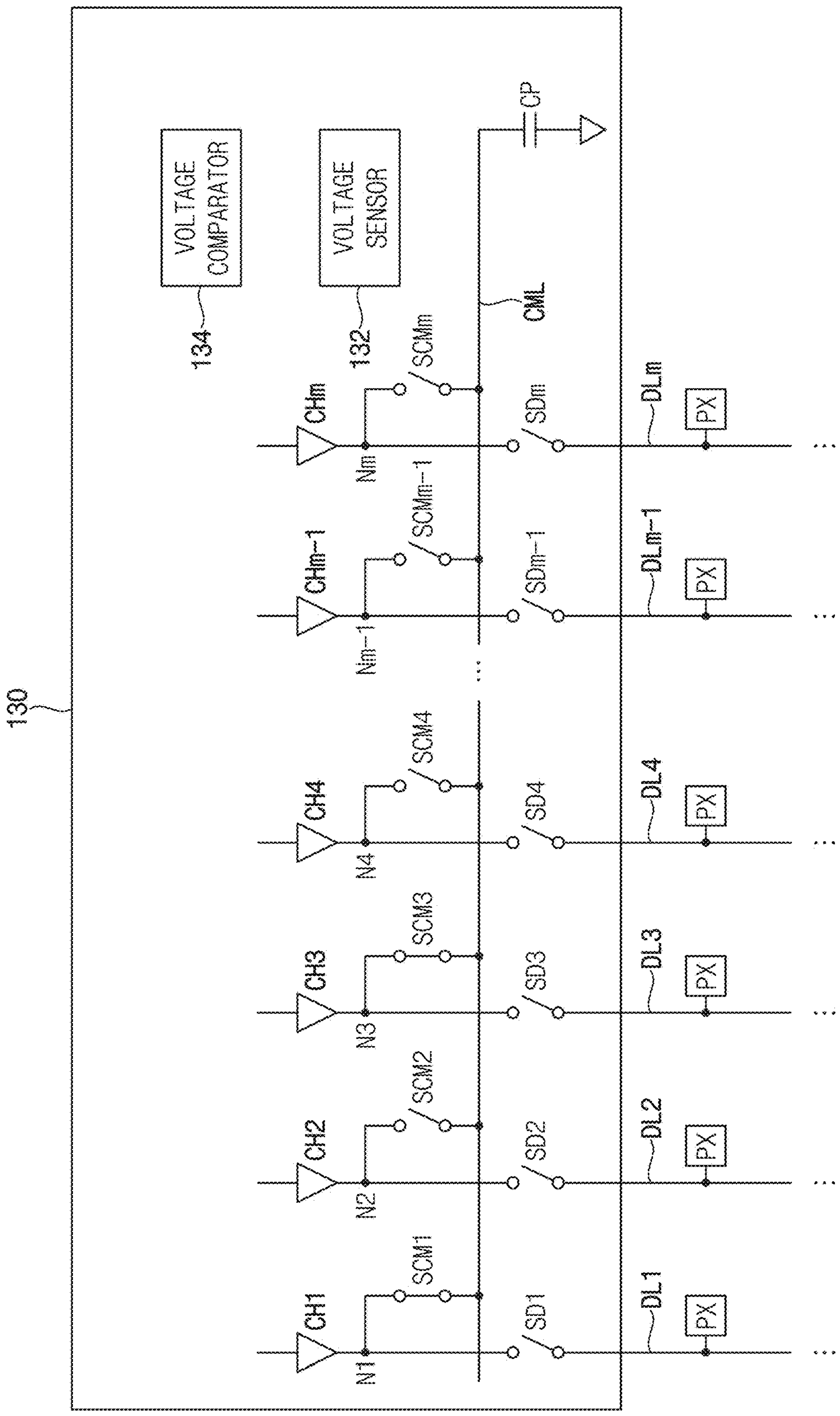

Referring to FIGS. 3 and 8, a channel, in which the common voltage VCOM is between the $n^{th}$ data voltage VDAT[n] and the $(n+1)^{th}$ data voltage VDAT[n+1], among the first to $m^{th}$ channels CH1, CH2, CH3, CH4, . . . , CHm−1, and CHm may be connected to the common line CML by a common switch corresponding thereto. In an embodiment, for example, as shown in FIG. 3, when the common voltage VCOM is about 3 V, the common voltage VCOM may be between the $n^{th}$ data voltage VDAT[n] (about 5 V) and the $(n+1)^{th}$ data voltage VDAT[n+1] (about 0 V) of the first channel CH1, and may be between the $n^{th}$ data voltage VDAT[n] (about 0 V) and the $(n+1)^{th}$ data voltage VDAT[n+1] (about 5 V) of the third channel CH3. Accordingly, the first and third common switches SCM1 and SCM3 may be turned on, and the second and fourth common switches SCM2 and SCM4 may be turned off. The first and third channels CH1 and CH3 may be connected to the common line CML through the first and third common switches SCM1 and SCM3, respectively. Accordingly, the first and third channels CH1 and CH3 may share charges by the common line CML. In addition, since the common line CML is connected to the first and third channels CH1 and CH3, a voltage level of the common voltage VCOM may be changed. In an embodiment, for example, as shown in FIG. 3, a voltage of the first node N1 of the first channel CH1, a voltage of the third node N3 of the third channel CH3, and the common voltage VCOM may be changed to about 2 V.

Figure 9:
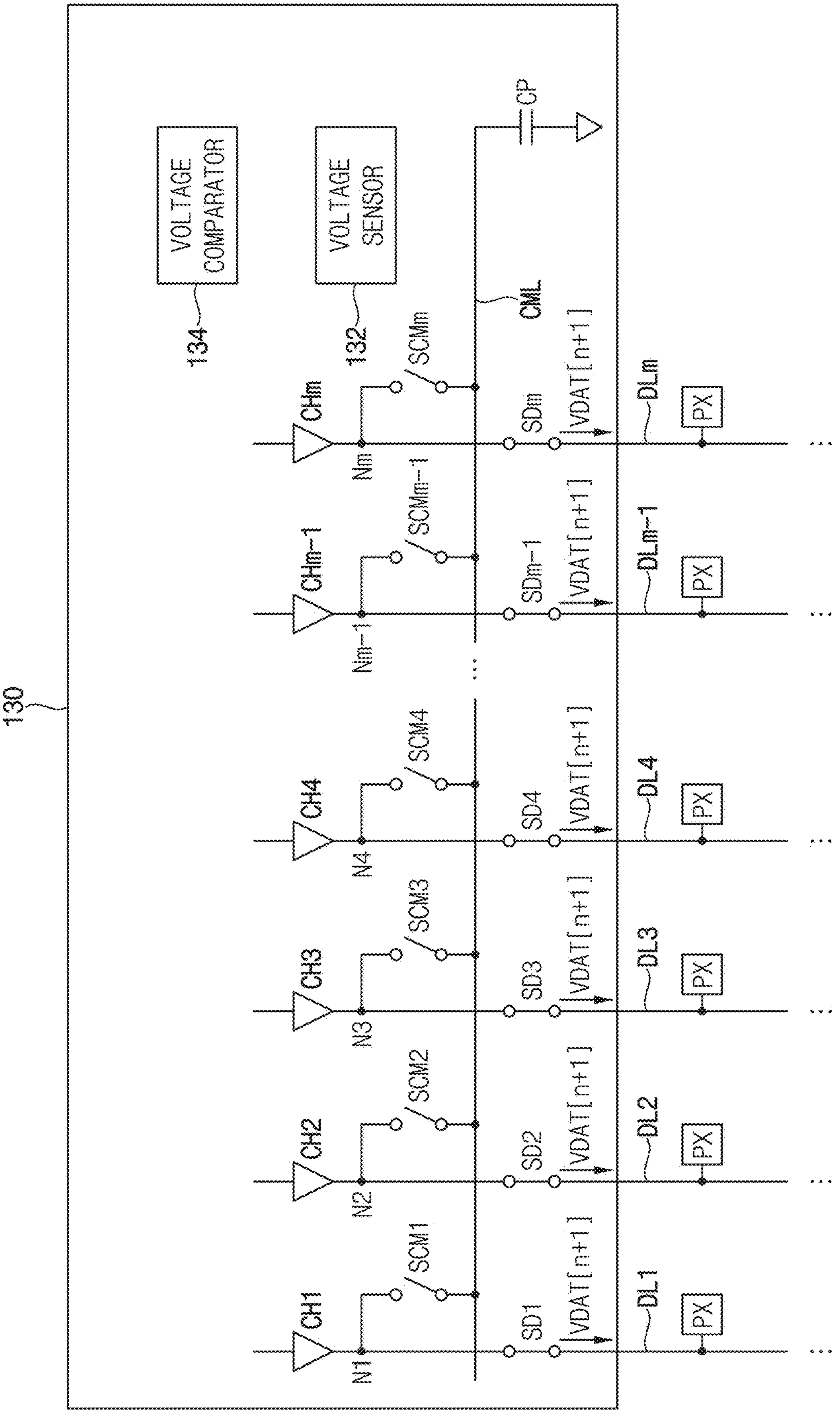

Referring to FIGS. 3 and 9, in the first period P1 of the $(n+1)^{th}$ horizontal period HP[n+1], the first to fourth channels CH1, CH2, CH3, and CH4 may output $(n+1)^{th}$ data voltages VDAT[n+1]. The first to fourth data switches SD1, SD2, SD3, and SD4 may be turned on, and the first to fourth channels CH1, CH2, CH3, and CH4 may be connected to the first to fourth data lines DL1, DL2, DL3, and DL4, respectively. Accordingly, the $(n+1)^{th}$ data voltages VDAT[n+1] output from the first to fourth channels CH1, CH2, CH3, and CH4 may be transmitted to the first to fourth data lines DL1, DL2, DL3, and DL4, respectively.

Since the first and third channels CH1 and CH3 share the charges in the fifth period P5 of the $n^{th}$ horizontal period HP[n], the first and third channels CH1 and CH3 may pre-charge the $(n+1)^{th}$ data voltages VDAT[n+1] output in the first period P1 of the $(n+1)^{th}$ horizontal period HP[n+1]. Accordingly, in the first period P1 of the $(n+1)^{th}$ horizontal period HP[n+1], a variation in the $(n+1)^{th}$ data voltages VDAT[n+1] output from the first and third channels CH1 and CH3 may be decreased, and power consumption of the data driver 130 may be decreased.

Figure 10:
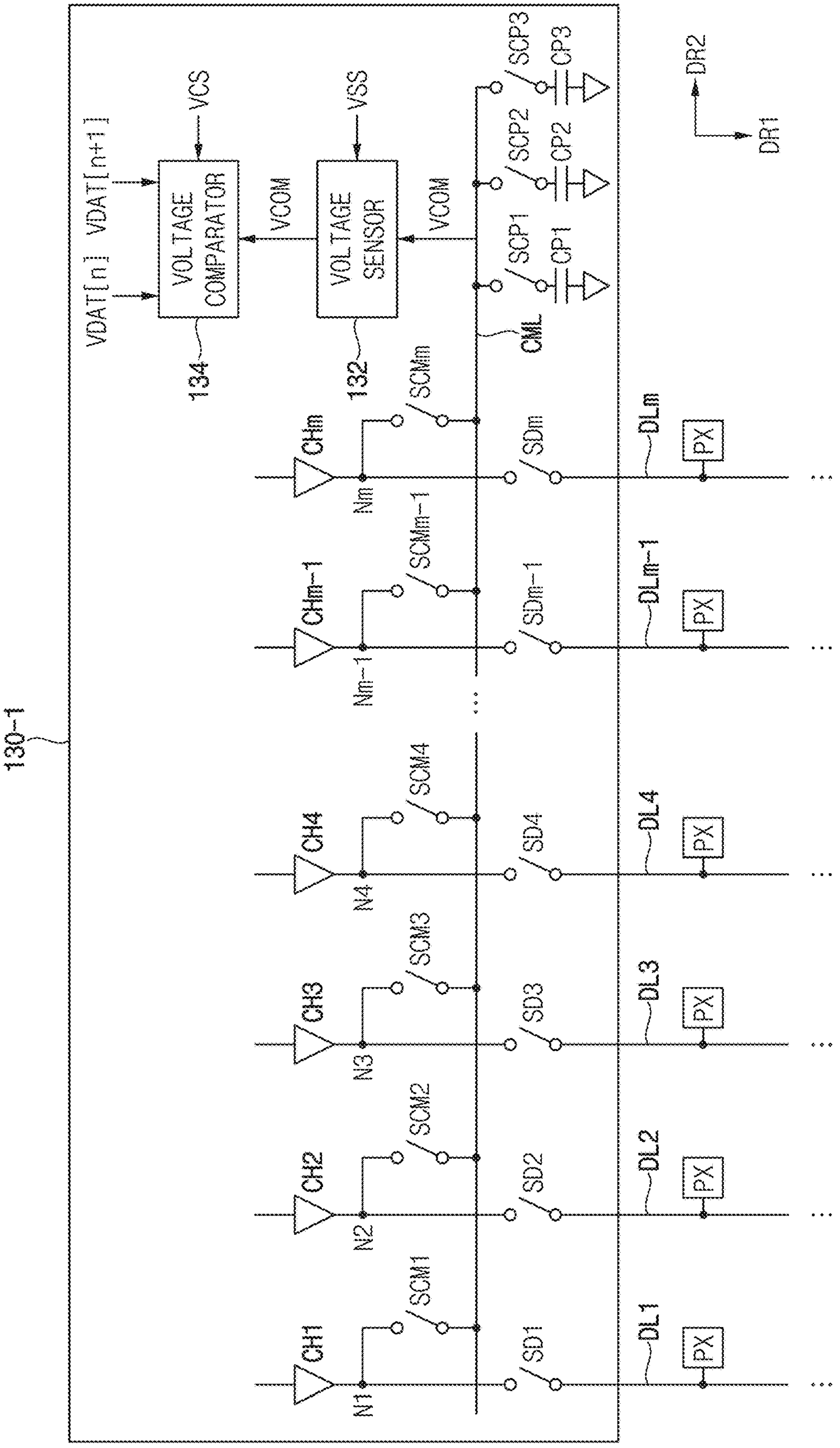
FIG. 10 is a block diagram showing a data driver according to an embodiment of the disclosure.

FIG. 10 is a block diagram showing a data driver 130-1 according to an embodiment of the disclosure.

Referring to FIG. 10, in an embodiment, a data driver 130-1 may include first to $m^{th}$ channels CH1, CH2, CH3, CH4, . . . , CHm−1, and CHm, a common line CML, first to third capacitors CP1, CP2, and CP3, first to $m^{th}$ data switches SD1, SD2, SD3, SD4, . . . , SDm−1, and SDm, first to $m^{th}$ common switches SCM1, SCM2, SCM3, SCM4, . . . , SCMm−1, and SCMm, first to third capacitor switches SCP1, SCP2, and SCP3, a voltage sensor 132, and a voltage comparator 134. While describing the data driver 130-1 with reference to FIG. 10, any repetitive detailed descriptions of components that are substantially identical or similar to the components of the data driver 130 described with reference to FIG. 2 will be omitted.

In an embodiment, the first to third capacitors CP1, CP2, and CP3 may be connected to the ground. The first to third capacitors CP1, CP2, and CP3 may store the common voltage VCOM of the common line CML.

According to an embodiment, capacitances of the first to third capacitors CP1, CP2, and CP3 may be equal to each other. According to another embodiment, the capacitances of the first to third capacitors CP1, CP2, and CP3 may be different from each other.

The first to third capacitor switches SCP1, SCP2, and SCP3 may selectively connect the first to third capacitors CP1, CP2, and CP3 to the common line CML. The first capacitor switch SCP1 may selectively connect the first capacitor CP1 to the common line CML, the second capacitor switch SCP2 may selectively connect the second capacitor CP2 to the common line CML, and the third capacitor switch SCP3 may selectively connect the third capacitor CP3 to the common line CML.

The common voltage VCOM of the common line CML may be increased or decreased by selective operations of the first to third capacitor switches SCP1, SCP2, and SCP3. When an amount of charges charged to the common line CML is constant, the common voltage VCOM may be increased when an equivalent capacitance of the common line CML is decreased, and the common voltage VCOM may be decreased when the equivalent capacitance of the common line CML is increased. Accordingly, in such an embodiment, the common voltage VCOM may be increased or decreased by controlling the equivalent capacitance of the common line CML through the selective operations of the first to third capacitor switches SCP1, SCP2, and SCP3.

According to an embodiment, when the common voltage VCOM is less than a minimum reference voltage, the common voltage VCOM may be increased by controlling the first to third capacitor switches SCP1, SCP2, and SCP3. In an embodiment, for example, while the first and second capacitor switches SCP1 and SCP2 are turned on, and the third capacitor switch SCP3 is turned off, when the common voltage VCOM is less than the minimum reference voltage, the equivalent capacitance of the common line CML may be decreased by turning off the first capacitor switch SCP1 or the second capacitor switch SCP2, so that the common voltage VCOM may be increased.

According to an embodiment, when the common voltage VCOM is greater than a maximum reference voltage, the common voltage VCOM may be decreased by controlling the first to third capacitor switches SCP1, SCP2, and SCP3. In an embodiment, for example, while the first and second capacitor switches SCP1 and SCP2 are turned on, and the third capacitor switch SCP3 is turned off, when the common voltage VCOM is greater than the maximum reference voltage, the equivalent capacitance of the common line CML may be increased by turning on the third capacitor switch SCP3, so that the common voltage VCOM may be decreased.

Although an embodiment in which the data driver 130-1 includes the three capacitors CP1, CP2, and CP3 selectively connected to the common line CML is shown in FIG. 10, the disclosure is not limited thereto. According to another embodiment, the data driver 130-1 may include two capacitors or four or more capacitors, which are selectively connected to the common line CML.

Figure 11:
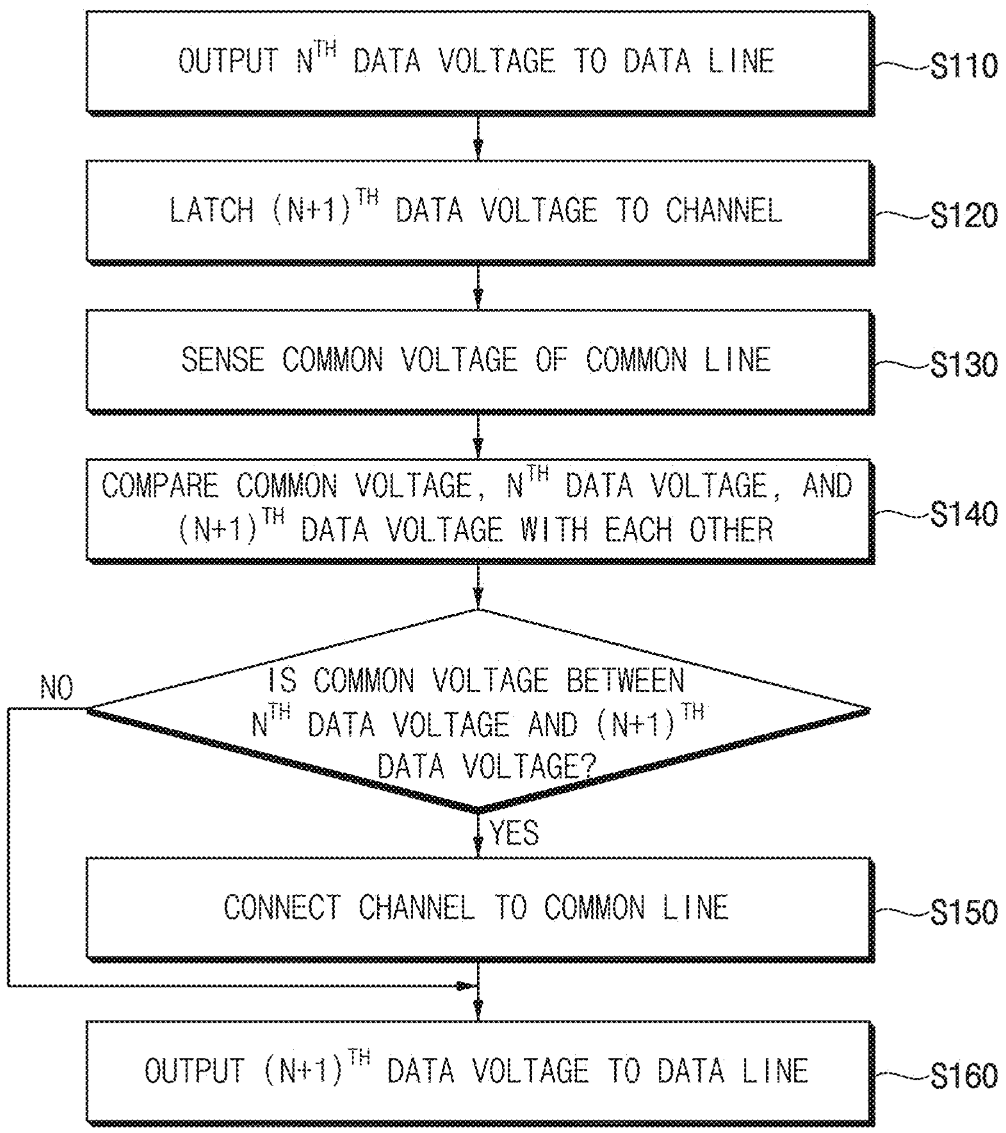
FIG. 11 is a flowchart showing a method for driving a display device according to an embodiment of the disclosure.

FIG. 11 is a flowchart showing a method for driving a display device according to an embodiment of the disclosure.

Referring to FIGS. 4 and 11, according to an embodiment of a method for driving a display device, $n^{th}$ data voltages VDAT[n] may be output from first to $m^{th}$ channels CH1, CH2, CH3, CH4, . . . , CHm−1, and CHm to first to $m^{th}$ data lines DL1, DL2, DL3, DL4, . . . , DLm−1, and DLm (S110). First to $m^{th}$ data switches SD1, SD2, SD3, SD4, . . . , SDm−1, SDm may be turned on, and the first to $m^{th}$ channels CH1, CH2, CH3, CH4, . . . , CHm−1, and CHm may be connected to the first to $m^{th}$ data lines DL1, DL2, DL3, DL4, . . . , DLm−1, and DLm, respectively. Accordingly, the $n^{th}$ data voltages VDAT[n] output from the first to $m^{th}$ channels CH1, CH2, CH3, CH4, . . . , CHm−1, and CHm may be transmitted to the first to $m^{th}$ data lines DL1, DL2, DL3, DL4, . . . , DLm−1, and DLm, respectively.

Referring to FIGS. 5 and 11, $(n+1)^{th}$ data voltages VDAT [n+1] may be latched to the first to $m^{th}$ channels CH1, CH2, CH3, CH4, . . . , CHm−1, and CHm (S120).

Referring to FIGS. 6 and 11, a common voltage VCOM of a common line CML may be sensed (S130). In response to a voltage sensing signal VSS having a turn-on voltage level, a voltage sensor 132 may sense the common voltage VCOM of the common line CML.

Referring to FIGS. 7 and 11, the common voltage VCOM, the $n^{th}$ data voltage VDAT[n], and the $(n+1)^{th}$ data voltage VDAT[n+1] may be compared with each other (S140). In response to a voltage comparison signal VCS having a turn-on voltage level, a voltage comparator 134 may compare the $n^{th}$ data voltage VDAT[n] and the $(n+1)^{th}$ data voltage VDAT[n+1] of each of the first to $m^{th}$ channels CH1, CH2, CH3, CH4, . . . , CHm−1, and CHm with the common voltage VCOM.

Referring to FIGS. 8 and 11, the channel may be connected to the common line CML when the common voltage VCOM is between the $n^{th}$ data voltage VDAT[n] and the $(n+1)^{th}$ data voltage VDAT[n+1] of the channel (S150). A channel, in which the common voltage VCOM is between the $n^{th}$ data voltage VDAT[n] and the $(n+1)^{th}$ data voltage VDAT[n+1], among the first to $m^{th}$ channels CH1, CH2, CH3, CH4, . . . , CHm−1, and CHm may be connected to the common line CML by a common switch corresponding thereto. In an embodiment, for example, as shown in FIG. 3, when the common voltage VCOM is between the $n^{th}$ data voltage VDAT[n] and the $(n+1)^{th}$ data voltage VDAT[n+1] of each of the first and third channels CH1 and CH3, the first and third channels CH1 and CH3 may be connected to the common line CML through first and third common switches SCM1 and SCM3, respectively. Accordingly, the first and third channels CH1 and CH3 may share charges by the common line CML.

Referring to FIGS. 9 and 11, the $(n+1)^{th}$ data voltages VDAT[n+1] may be output from the first to $m^{th}$ channels CH1, CH2, CH3, CH4, . . . , CHm−1, and CHm to the first to $m^{th}$ data lines DL1, DL2, DL3, DL4, . . . , DLm−1, and DLm (S160). The first to $m^{th}$ data switches SD1, SD2, SD3, SD4, . . . , SDm−1, and SDm may be turned on, and the first to $m^{th}$ channels CH1, CH2, CH3, CH4, . . . , CHm−1, and CHm may be connected to the first to $m^{th}$ data lines DL1, DL2, DL3, DL4, . . . , DLm−1, and DLm, respectively. Accordingly, the $(n+1)^{th}$ data voltages VDAT[n+1] output from the first to $m^{th}$ channels CH1, CH2, CH3, CH4, . . . , CHm−1, and CHm may be transmitted to the first to $m^{th}$ data lines DL1, DL2, DL3, DL4, . . . , DLm−1, and DLm, respectively.

Figure 12:
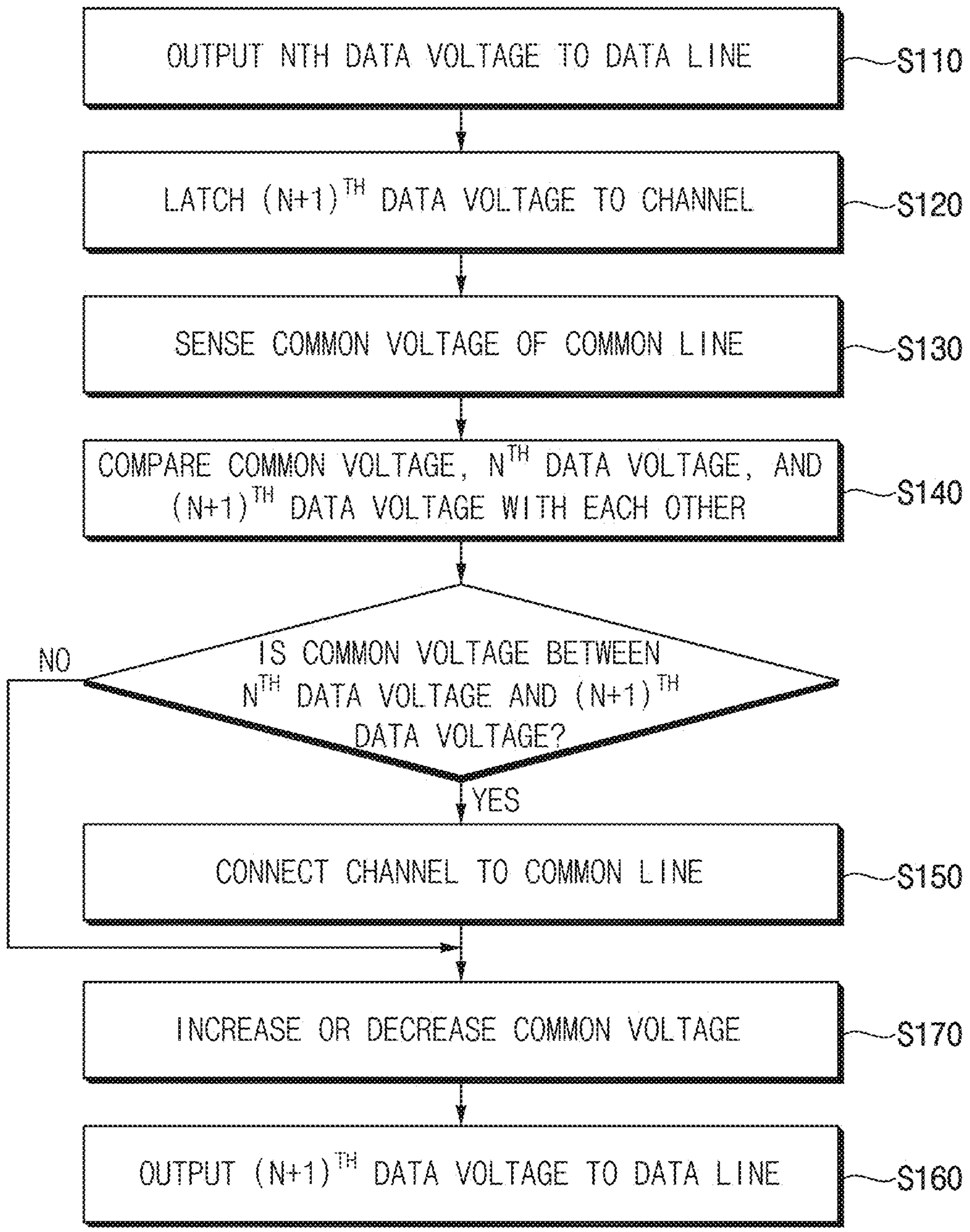
FIG. 12 is a flowchart showing a method for driving a display device according to an embodiment of the disclosure.

FIG. 12 is a flowchart showing a method for driving a display device according to an embodiment of the disclosure.

In describing an embodiment of a method for driving a display device shown in FIG. 12, any repetitive detailed descriptions of processes that are substantially identical or similar to those of the embodiments of the method for driving the display device described above with reference to FIG. 11 will be omitted.

Referring to FIGS. 10 and 12, in an embodiment of a method for driving a display device, after the channel is connected to the common line CML when the common voltage VCOM is between the $n^{th}$ data voltage VDAT[n] and the $(n+1)^{th}$ data voltage VDAT[n+1] of the channel (S150) and before the $(n+1)^{th}$ data voltages VDAT[n+1] are output from the first to $m^{th}$ channels CH1, CH2, CH3, CH4, . . . , CHm−1, and CHm to the first to $m^{th}$ data lines DL1, DL2, DL3, DL4, . . . , DLm−1, and DLm (S160), the common voltage VCOM may be increased or decreased (S170). The common voltage VCOM of the common line CML may be increased or decreased by selective operations of first to third capacitor switches SCP1, SCP2, and SCP3.

According to an embodiment, when the common voltage VCOM is less than a minimum reference voltage, the common voltage VCOM may be increased by controlling the first to third capacitor switches SCP1, SCP2, and SCP3.

According to an embodiment, when the common voltage VCOM is greater than a maximum reference voltage, the common voltage VCOM may be decreased by controlling the first to third capacitor switches SCP1, SCP2, and SCP3.

Figure 13:
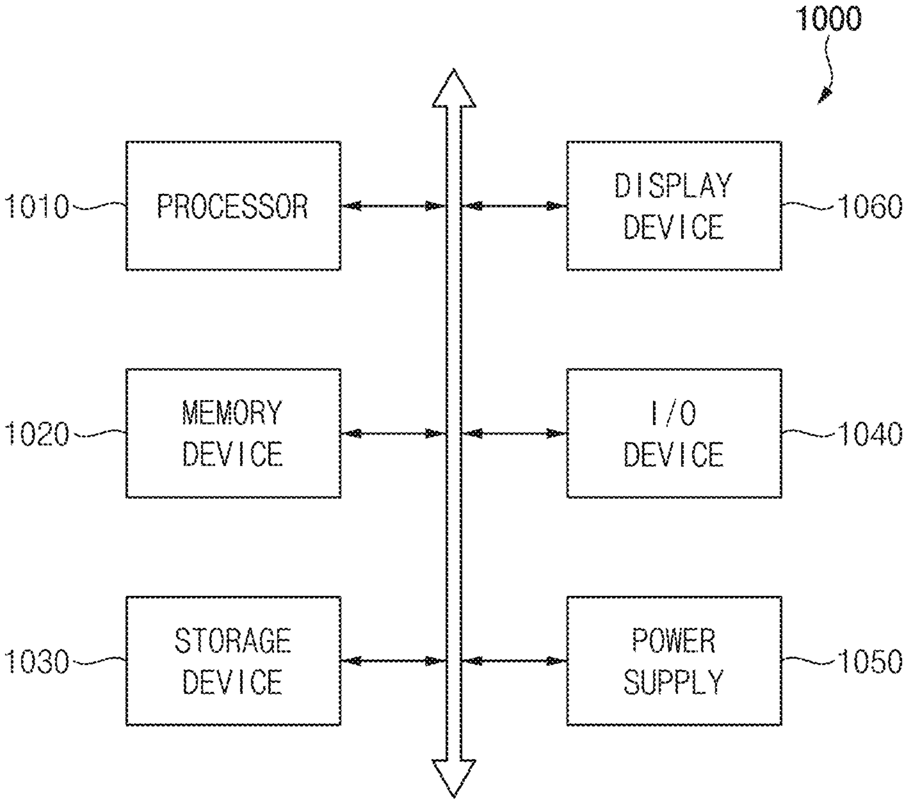
FIG. 13 is a block diagram showing an electronic device according to an embodiment of the disclosure.

FIG. 13 is a block diagram showing an electronic device 1000 according to an embodiment of the disclosure.

Referring to FIG. 13, an embodiment of an electronic device 1000 may include a processor 1010, a memory device 1020, a storage device 1030, an input/output (I/O) device 1040, a power supply 1050, and a display device 1060. The display device 1060 may correspond to the display device 100 of FIG. 1. The electronic device 1000 may further include a plurality of ports capable of communicating with a video card, a sound card, a memory card, a USB device, or the like, or communicating with other systems.

The processor 1010 may perform specific calculations or tasks. According to an embodiment, the processor 1010 may be a microprocessor, a central processing unit (CPU), or the like. The processor 1010 may be connected to other components through an address bus, a control bus, a data bus, or the like. According to an embodiment, the processor 1010 may also be coupled to an expansion bus such as a peripheral component interconnect (PCI) bus. According to an embodiment, the processor 1010 may provide first image data (IMD1 of FIG. 1) and a control signal (CNT of FIG. 1) to the display device 1060.

The memory device 1020 may store data required for an operation of the electronic device 1000. In an embodiment, for example, memory device 1020 may include: a nonvolatile memory device such as an erasable programmable read-only memory (EPROM), an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), or a ferroelectric random access memory (FRAM); and/or a volatile memory device such as a dynamic random access memory (DRAM), a static random access memory (SRAM), or a mobile DRAM.

The storage device 1030 may include a solid state drive (SSD), a hard disk drive (HDD), a CD-ROM, and or like. The I/O device 1040 may include: an input device such as a keyboard, a keypad, a touch pad, a touch screen, or a mouse; and an output device such as a speaker or a printer. The power supply 1050 may supply a power required for the operation of the electronic device 1000. The display device 1060 may be connected to other components through the buses or other communication links.

In a data driver included in the display device 1060 according to embodiments, a voltage sensor may sense a common voltage of a common line, and channels may share charges through the common line, so that data voltages of the channels may be pre-charged, and power consumption of the data driver may be decreased.

The display device according to embodiments may be applied to a display device included in a computer, a notebook, a mobile phone, a smart phone, a smart pad, a portable media player (PMP), a personal digital assistant (PDA), an MP3 player, or the like.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising: a display panel including a plurality of pixels, and a plurality of data lines connected to the pixels; and a data driver which provides a plurality of data voltages to the data lines, wherein the data driver includes: a plurality of channels, wherein each of the channels outputs an n.sup.th data voltage in an n.sup.th horizontal period, and outputs an (n+1).sup.th data voltage in an (n+1).sup.th horizontal period, wherein n is a natural number; a common line; a plurality of data switches which selectively connects the channels to the data lines, respectively; a plurality of common switches, wherein each of the common switches selectively connects a corresponding one of the channels to the common line; and a voltage sensor which senses a common voltage of the common line; wherein the data driver further includes a voltage comparator which compares the common voltage, the n.sup.th data voltage, and the (n+1).sup.th data voltage with each other; wherein a channel among the channels is connected to the common line by a common switch corresponding thereto among the common switches when the common voltage is between the n.sup.th data voltage of the channel and the (n+1).sup.th data voltage of the channel.

2. The display device of claim 1, wherein the data driver further includes a capacitor connected between the common line and a ground.

3. The display device of claim 1, wherein the data driver further includes:

a plurality of capacitors connected to a ground; and a plurality of capacitor switches, wherein each of the capacitor switches selectively connects a corresponding one of the capacitors to the common line.

4. The display device of claim 3, wherein capacitances of the capacitors are equal to each other.

5. The display device of claim 3, wherein capacitances of the capacitors are different from each other.

6. The display device of claim 3, wherein the common voltage is increased or decreased by selective operations of the capacitor switches.

7. The display device of claim 1, wherein, when the common voltage is less than a minimum reference voltage, the common voltage is increased.

8. The display device of claim 1, wherein, when the common voltage is greater than a maximum reference voltage, the common voltage is decreased.

9. The display device of claim 1, wherein each of the data lines extends in a first direction, and the common line extends in a second direction intersecting the first direction.

10. The display device of claim 1, further comprising:

a scan driver which provides a plurality of scan signals to the pixels; and a controller which controls the data driver and the scan driver.

11. A data driver which provides a plurality of data voltages to a plurality of data lines, respectively, the data driver comprising:

a plurality of channels, wherein each of the channels outputs an n.sup.th data voltage in an n.sup.th horizontal period, and outputs an (n+1).sup.th data voltage in an (n+1).sup.th horizontal period, wherein n is a natural number; a common line;

a plurality of data switches which selectively connects the channels to the data lines, respectively; a plurality of common switches, wherein each of the common switches selectively connects a corresponding one of the channels to the common line;

a voltage sensor which senses a common voltage of the common line; and a voltage comparator which compares the common voltage, the n.sup.th data voltage, and the (n+1).sup.th data voltage with each other; wherein a channel among the channels is connected to the common line by a common switch corresponding thereto among the common switches when the common voltage is between the n.sup.th data voltage of the channel and the (n+1).sup.th data voltage of the channel.

12. The data driver of claim 11, further comprising:

a plurality of capacitors connected to a ground; and a plurality of capacitor switches, wherein each of the capacitor switches selectively connects a corresponding one of the capacitors to the common line.

13. A method for driving a display device, the method comprising:

outputting an $n^{th}$ data voltage from a channel to a data line, wherein n is a natural number;

latching an $(n+1)^{th}$ data voltage to the channel;

sensing a common voltage of a common line;

comparing the common voltage, the $n^{th}$ data voltage, and the $(n+1)^{th}$ data voltage with each other;

connecting the channel to the common line when the common voltage is between the $n^{th}$ data voltage and the $(n+1)^{th}$ data voltage; and outputting the $(n+1)^{th}$ data voltage from the channel to the data line.

14. The method of claim 13, further comprising:

increasing or decreasing the common voltage after the connecting the channel to the common line and before the outputting the $(n+1)^{th}$ data voltage.

15. The method of claim 14, wherein, the increasing or decreasing the common voltage comprises increasing the common voltage when the common voltage is less than a minimum reference voltage.

16. The method of claim 14, wherein, in the increasing or decreasing the common voltage comprises decreasing the common voltage when the common voltage is greater than a maximum reference voltage.

* * * * *